June 19, 1934.  A. PROCOFIEFF-SEVERSKY  1,963,630
AMPHIBIAN LANDING GEAR FOR AIRCRAFT
Filed March 28, 1927   5 Sheets-Sheet 1

Inventor
Alexander Procofieff Seversky
By his Attorneys

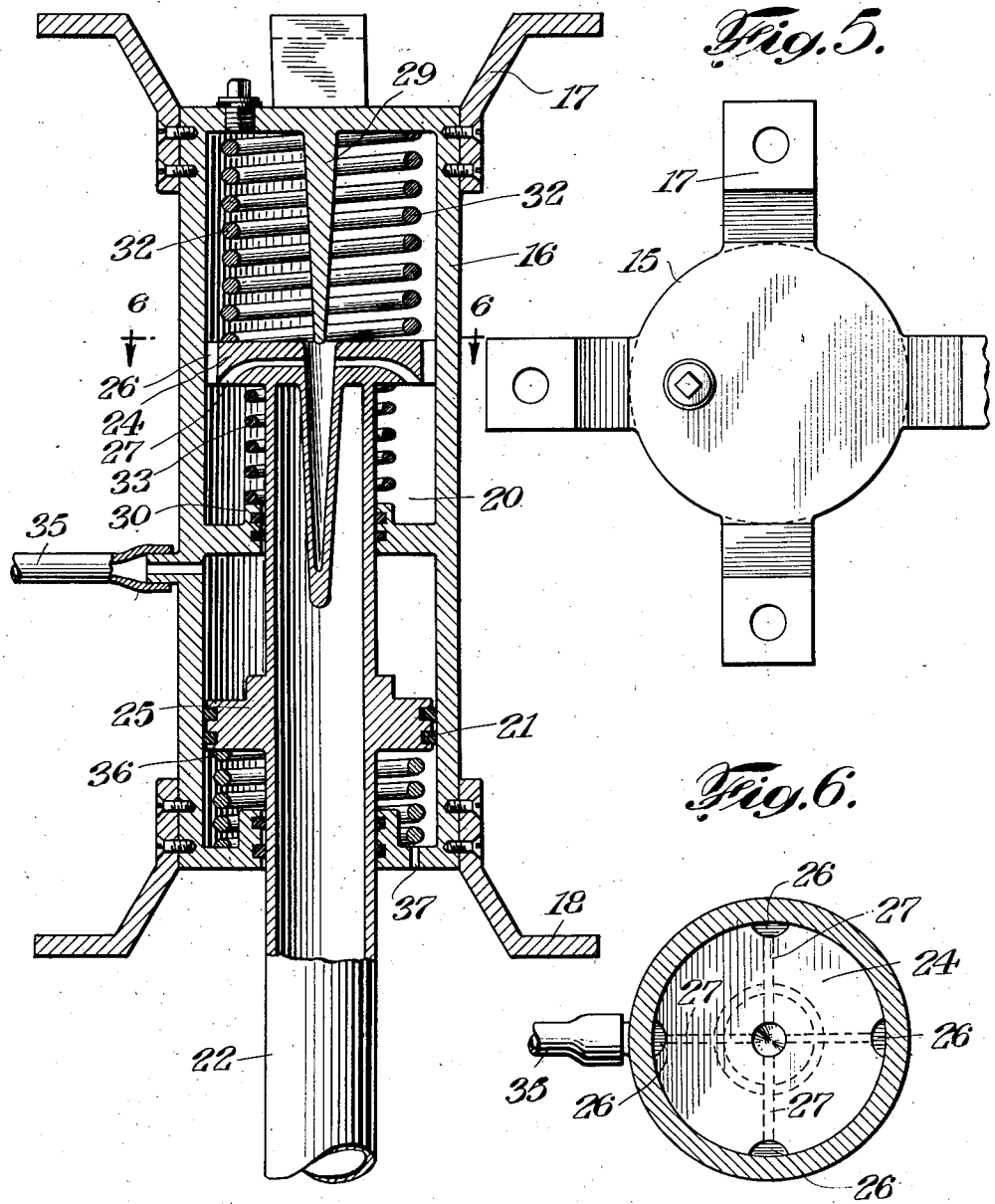

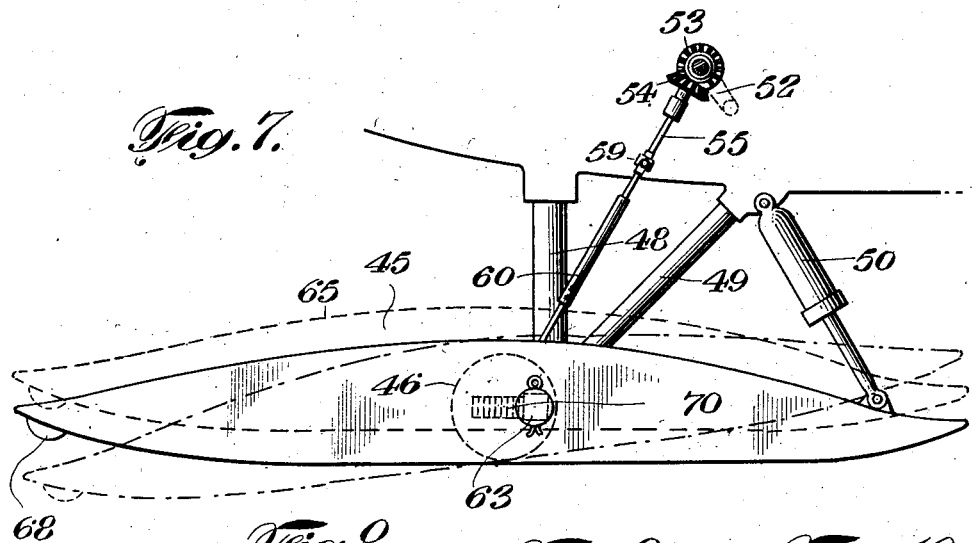
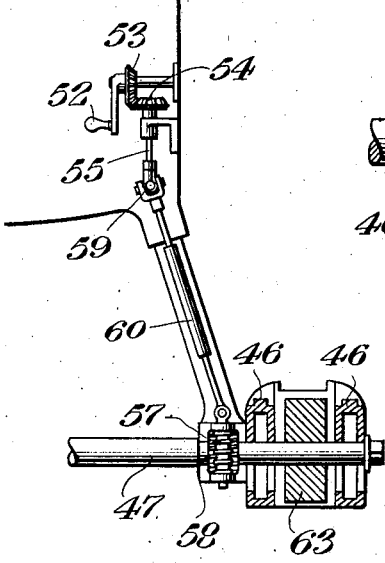
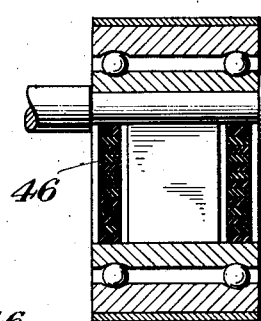
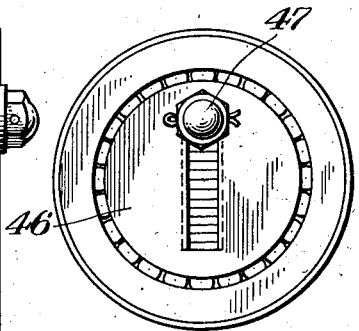

June 19, 1934.  A. PROCOFIEFF-SEVERSKY  1,963,630
AMPHIBIAN LANDING GEAR FOR AIRCRAFT
Filed March 28, 1927   5 Sheets-Sheet 4

Inventor
Alexander Procofieff Seversky
By his Attorneys

June 19, 1934.  A. PROCOFIEFF-SEVERSKY  1,963,630
AMPHIBIAN LANDING GEAR FOR AIRCRAFT
Filed March 28, 1927   5 Sheets-Sheet 5
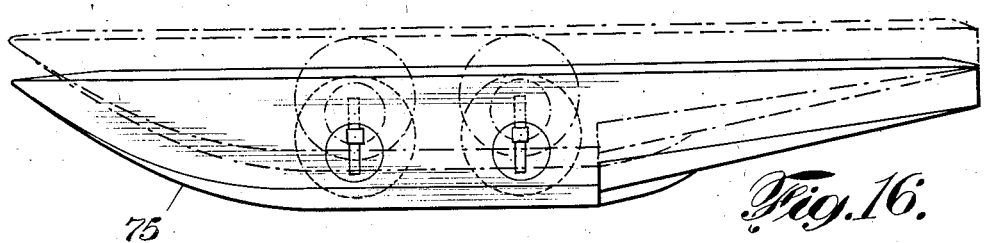
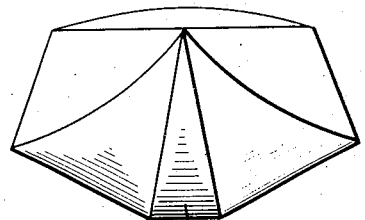
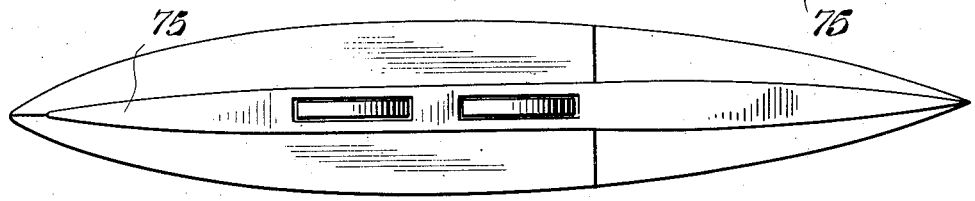
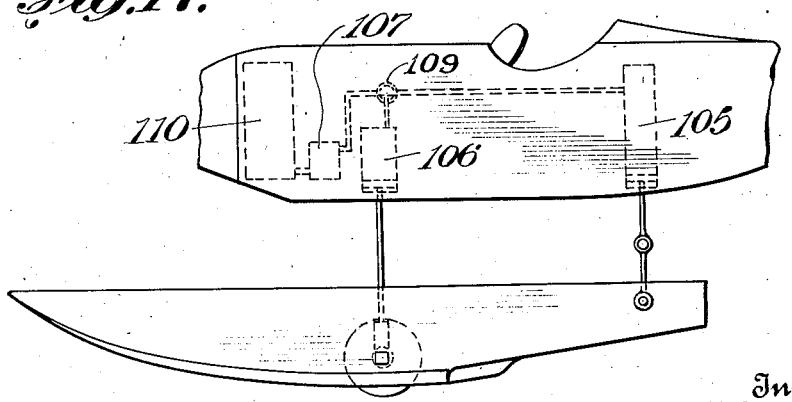
Inventor
Alexander Procofieff Seversky
By his Attorneys Patented June 19, 1934

1,963,630

UNITED STATES PATENT OFFICE 1,963,630

AMPHIBIAN LANDING GEAR FOR AIRCRAFT

Alexander Procofieff-Seversky, New York, N. Y., assignor, by mesne assignments, to Seversky Aircraft Corporation, a corporation of Delaware Application March 28, 1927, Serial No. 178,857

22 Claims. (Cl. 244—2)

The present invention relates to landing gear for aircraft and has for an object to provide a universal landing gear adapted for landing on the ground or on the water. The invention provides a landing gear which may combine a pair of pontoons for landing on water, or skis for landing on snow, with suitable wheels for landing on bare ground, the arrangement being such that either the wheels on the one hand, or the pontoon or ski on the other hand, may be projected for landing. The invention also provides an improved hydraulic plunger arrangement for resisting relative movement of the landing gear and aircraft body together with means whereby the same plunger arrangement may be operated to rock the landing gear relative to the body of the aircraft.

The nature and objects of the invention will be better understood from a consideration of particular illustrative embodiments thereof, certain of which are shown in the accompanying drawings forming a part hereof and in which—

Figure 4 is a detail sectional view of the plunger arrangement shown in Fig. 1.

Figure 5 is a top plan view of the same.

Figure 6 is a sectional view taken on the line 6—6 of Fig. 4.

Figure 7 is a side view of another embodiment of the invention in which the landing gear combines skids, which also may serve as pontoons, with ground engaging wheels.

Figure 8 is a detail view showing mechanism for moving the skid shown in Fig. 7 vertically to different positions.

Figure 9 is a detail sectional view showing the eccentric for moving the skid vertically.

Figure 10 is a side view of the same.

Figure 11 is a detail view of the extensible shaft forming a part of the mechanism shown in Fig. 8.

Figure 14 is a view in side elevation of the skid or pontoon shown in Fig. 12.

Figure 15 is a bottom plan view of the same.

Figure 16 is an end view thereof, and

Figure 17 is a view showing diagrammatically interconnected hydraulic shock absorbers.

Figure 1:
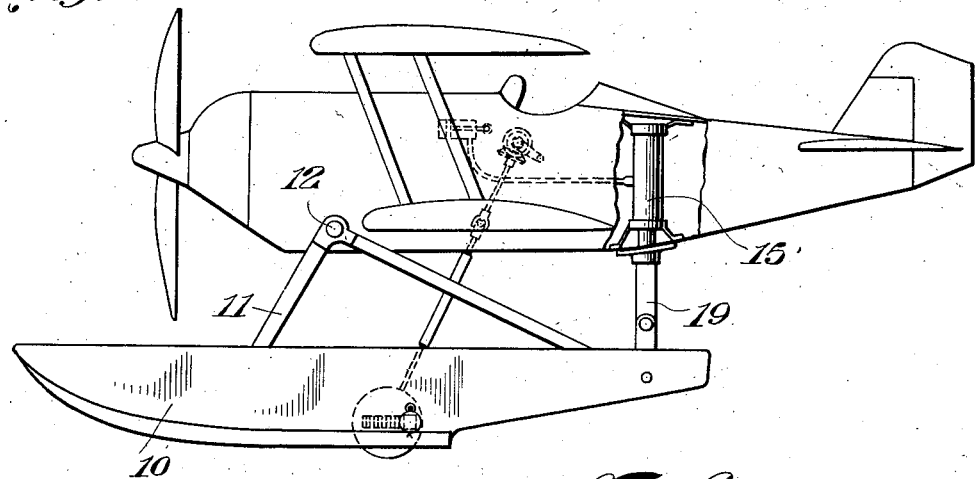
Figure 1 is a view in side elevation of an aircraft with a landing gear combining pontoons with ground engaging wheels and a hydraulic plunger mechanism operable to adjust the angle of the pontoon relative to the body of the aircraft and operable also to resist shocks of landing.
Figure 2:
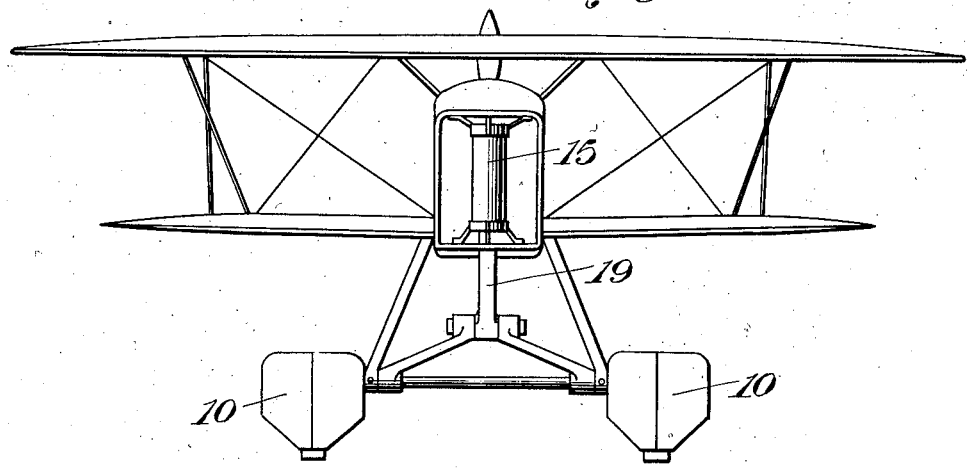
Figure 2 is a rear view of the aircraft shown in Fig. 1.
Figure 3:
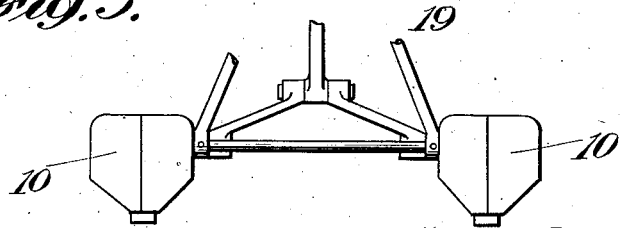
Figure 3 is a front view of the portion of the landing gear shown in Fig. 2.
Figure 12:
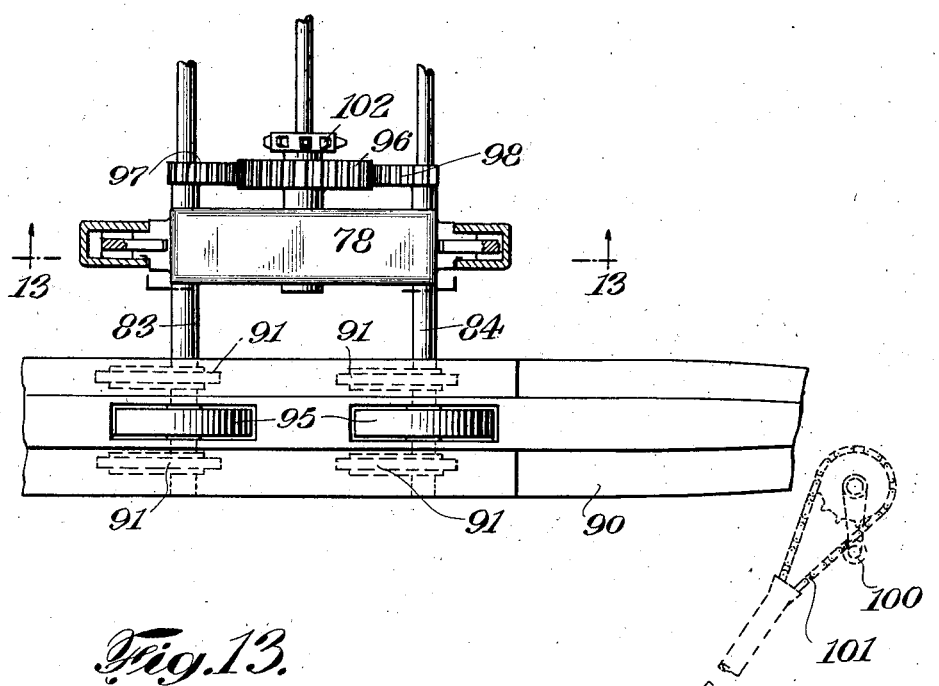
Figure 12 is another embodiment of the invention combining the vertically movable skid or pontoon with ground engaging wheels.
Figure 13:
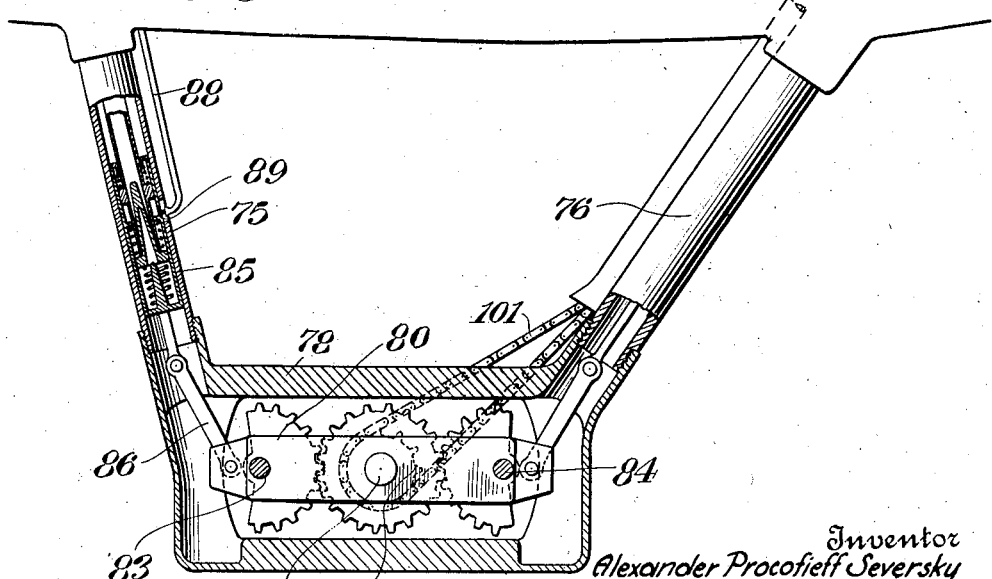
Figure 13 is a sectional view of the same taken substantially on the line 13—13 of Fig. 12.

The arrangement shown in Figs. 1 to 6 inclusive comprises a pair of suitable ground engaging elements 10, which conveniently may be pontoons supported by a rigid frame 11 pivoted to the body of an aircraft at a point more or less close to the centre of gravity of the craft as at 12 for limited pivoted movement, and controlled in that pivotal movement by means of a plunger mechanism 15. This arrangement has certain advantages over one in which the point of pivotal movement between the ski and the craft is within or near the ground engaging elements. The plunger mechanism 15 may serve either or both of two purposes. It may be designed to provide for rocking the pontoon 10 about its pivot 12 in order that it may be positioned, as may be desired during flight or for landing, under control of the pilot or for raising the tail of the craft when the craft is resting on the water or ground. It may be designed to serve as a cushioning device to resist the shocks of landing in so far as such shocks tend to move either the body of the aircraft or the landing gear about the pivot 12. It may also be designed to serve both purposes. If desired, the plunger mechanism can be operated to hold the pontoon rigidly in adjusted position.

The particular form of plunger mechanism shown in Figs. 4, 5 and 6 for the purpose of illustration is so designed that it may operate either to adjust the angular position of the pontoon or it may operate yieldably to resist landing shocks. As shown, it comprises a cylinder 16 which is arranged to be rigidly connected to the body of the aircraft by means of suitable brackets 17, 18. The piston rod 19 is connected to the pontoon by a link arrangement pivoted both to the piston rod and to the pontoon. The necessary flexibility of movement may be provided by mounting the cylinder pivotally. This cylinder is divided into upper and lower compartments 20, 21 in which moves a piston rod 22 carrying upper and lower piston heads 24, 25. The upper piston head 24 is provided with by-passes or ports 26, 27 to permit restricted flow of oil or the like pass the piston head in the chamber 20 during the movement of the piston rod 22, either when actuated manually or when moved as a result of landing shock.

The ports 27 are preferably provided with means for automatically closing the same gradually during the relatively upward movement of the piston 22. As shown, a tapered valve closing member 29 moves into a correspondingly tapered passage 30 to close gradually the inner ends of the ports 27. Upward movement of the plunger beyond the normal position shown is also resisted by a relatively stiff spring 32, while a weaker compression spring 33 positioned below the plunger tends to maintain it in the normal position indicated at substantially the center of the chamber 20. The piston 22 may be forced downwardly more or less by pumping oil through the inlet 35 into the chamber 21 behind the piston 25. A spring 36 may be provided beneath the piston 25 as shown. The chamber 21 is preferably provided with a vent 37 to permit escape of any oil which may work into the lower portion of the chamber.

The embodiment shown in Figs. 7 to 11 provides a combination of skids which may be formed to serve as pontoons and ground wheels in which the skids can be moved to three different positions for three different types of landing. As shown, a pair of skids 45, only one of which is shown, are carried on accentrics 46 secured to the axle 47 carried at the lower end of suitable struts 48, 49 secured to the body of the aircraft. The rear ends of the skids are connected to the body of the craft by strut members comprising dash pots 50 which are arranged to resist the shocks of landing. The shaft 47 is arranged to be rotated by the pilot by means of gearing comprising a crank 52 connected by beveled gears 53, 54 to shaft 55 which drives the worm 57, which in turn engages a worm wheel 58 secured to the rotatable axle 47. The connections between the shaft 55 and the worm 57 may comprise a universal joint 59 and an extensible shaft 60 of usual construction. Within each skid is arranged a wheel 63 rotatable on the axle 47 and arranged to engage the ground only when the skid is lifted above the intermediate position. When the skids are in the intermediate position shown in Fig. 7 the ground wheels 63 are within the skids and protected from engagement with the ground and the skids serve for landing on snow or any sufficiently slippery surface. When it is desired to land on the ground wheels, the eccentrics 46 are rotated by means of the hand crank 52 to elevate the skids to the position indicated in dotted lines at 65. The relative positions of the eccentrics and of the dash pot connection 50 are such that the skid moves upwardly to a position substantially parallel with its intermediate position thus leaving the wheels projected to ground engaging position. By operating the eccentrics 46 in the opposite direction to move the skids downwardly to the position indicated in dotted lines at 66, landing may be made upon special surfaces such as may be provided on the decks of battleships or other platforms wherein it is desired that the forward ends of the skids having suitable guide projections 68 shall engage the specially prepared surface. When landing in such manner, as the weight of the craft is applied to the landing gear the skids will rotate about eccentrics 46 against the resistance of the yieldable member 50 designed particularly for this purpose. Additional resilience is preferably given to landing gear for this last use by providing within the eccentrics yieldable resistance members 70 which may be of rubber, which members lie in vertical position and against the under side of the axle 47 when the eccentrics are rotated to the position for this use of the landing gear.

In Figs. 12 to 16 is shown an embodiment of the invention wherein two ground wheels are provided in each pontoon and wherein each pontoon is mounted on fore and aft eccentrics operated to rotate in parallel to move the pontoon vertically while maintaining it in its original horizontal position. The base of each pontoon is shown as ski-shaped for landing on snow. This landing gear comprises frame members 75 and 76 extending downwardly from the body of the aircraft together with a casing 78 secured thereto. Ordinarily frame members 75 and 76 together with a casing 78 are provided on each side of the aircraft and two pontoons are carried, one outside of each casing. The arrangement on one side of the craft only is shown in the drawings. As shown, the casing carries a rocker member 80 mounted to rock on a central pivot shaft 82 in the casing and this rocker member carries two shafts 83, 84. Preferably shafts 83 and 84 are continuous and extend across to both sides of the landing gear and thereby connect the two rocker members relatively rigidly to form one unit structure. Rocking movement of the frame 80 may be resisted by hydraulic dash pot mechanism of the general character of that shown in Fig. 4. There may be either one or two of these mechanisms on each side of the craft as desired and they may be positioned in the struts 75 and 76. In the arrangement shown, these hydraulic devices are provided in both the struts 75 and the struts 76. As shown, the casing member of the hydraulic mechanism shown is movable and is connected by means of a link 86 to the rocker member 80. The construction of this hydraulic member is substantially the same as that shown in Fig. 4 and need not be further described, except to note that provision is made for pumping oil through the tube 88 into the hydraulic member to rock the rocker member 80 by means of an inlet extending through a slot 89 in the strut member 75.

At the outer ends of the shafts 83 and 84 are carried pontoons 90 which are mounted on eccentrics 91 which operate simultaneously to move the pontoons 90 to maintain them always in parallel relation to their normal position. As the pontoons are elevated ground wheels 95 project beneath the pontoons to ground engaging position. The shafts 83 and 84 may conveniently be rotated by means of a gear 96 engaging gears 97 and 98 secured to the shafts 83 and 84. In view of the limited rotary movement of the shafts 83 and 84, the gears 97 and 98 may be gear segments instead of complete gears. The gear 96 may conveniently be operated from a hand crank 100 in convenient reach of the pilot through a chain and sprocket gearing 101, 102.

The embodiment of the invention shown in Fig. 17 is in some respects similar to that shown in Fig. 1 but provides an arrangement whereby the oil forced from the compression cylinder of the shock absorber 105 may be forced into a cylinder 106 for moving the wheels downwardly into ground engaging position. In this arrangement, as in the arrangement shown in Fig. 1, provision is made for pumping oil from a hand pump 107 through a suitable conduit into the shock absorber 105 for forcing down the tail of the skid, whether it be a pontoon, ski or other form of skid. A three-way valve 109 is provided whereby oil may be pumped into the cylinder 106 for forcing the wheels downwardly relative to the skid into ground engaging position from the tank 110. The cylinder 106 is also adapted to serve as a shock absorbing element for the wheels.

The valve 109 may be set to permit oil to flow from the cylinder 105 to the cylinder 106, as the force of landing compresses the shock absorber 105, thus automatically forcing the wheels into engagement with the ground when, in the course of landing, the speed is reduced and the wheels become especially desirable.

In the operation of the device, when landing, the tail of the aircraft will first engage the ground forcing the plunger of the shock absorber upwardly pumping the oil therefrom through the valve 109 into the shock absorber 106 for forcing the wheels downwardly into engagement with the ground. By the time the aircraft has lost speed sufficiently so that it is desirable that the wheels should engage the ground they will be forced downwardly relative to the pontoons into ground engaging position. During the further course of landing the valve 109 may be opened to permit the oil to flow from the shock absorber 106 into the tank 110 to retract the wheels and permit the pontoons to engage the ground to serve as a brake. When it is desired to project the wheels while the aircraft is at rest, oil may be forced into the shock absorber 106 either by use of the pump 107 or by elevating the tail, using the power of the engine, with the valve 109 opened to permit flow of oil from the tank to the shock absorber 105 and again lowering the tail with the valve opened to pass the oil from the shock absorber 105 to the shock absorber 106.

The present invention is an improvement on the invention shown in my co-pending application for Landing gear for aircraft, Serial No. 124,562, filed July 24th, 1926.

The embodiments particularly described are illustrative merely and are not intended as defining the limits of the invention as numerous variations in the embodiments illustrated and various embodiments may be developed without departing from the spirit of the invention.

I claim:—

1. Landing gear for aircraft comprising in combination a skid arranged to be pivotally connected to the body of a craft, an hydraulic plunger mechanism and means for controlling the amount of fluid therein to adjust the position of the skid angularly relative to the body of the craft.

2. Landing gear, as defined in claim 1, comprising a ground engaging wheel and means for projecting and retracting said skid relative to the wheel to and from operative ground engaging position.

3. Landing gear for aircraft comprising a plunger mechanism having a cylinder, a pair of pistons movable therein, one of which is provided with a by-pass and means for pumping fluid to one side of the other piston to adjust the position of both pistons.

4. Landing gear for aircraft comprising in combination a skid, a ground engaging wheel carried in a relatively fixed position, means for moving said skid vertically relative to said wheel in a longitudinal vertical plane.

5. Landing gear for aircraft comprising in combination a skid, yieldable means for pivotally connecting one portion of said skid to the body of an aircraft, eccentric means for moving another portion of said skid vertically to adjust the angular position of the same relative to the body of the aircraft.

6. Landing gear for aircraft, as defined in claim 5, comprising a ground engaging wheel relative to which a skid is vertically movable to expose or protect said wheel.

7. Landing gear for aircraft comprising an axle, a ground engaging wheel mounted on said axle, a skid and an eccentric connecting said skid to said axle and means for rotating said eccentric to move the skid vertically relative to said wheel.

8. Landing gear for aircraft comprising in combination a skid, a skid supporting frame, said frame being arranged to be pivotally connected to the body of an aircraft, a plunger mechanism for resisting pivotal movement of said frame relative to the body of the aircraft, a pair of ground engaging wheels and a pair of eccentrics arranged to move said skid vertically relative to said ground engaging wheels to permit said wheels or skid to engage the ground alternatively.

9. Landing gear for aircraft, as defined in claim 8, wherein a plunger mechanism is operative under manual control to adjust the angular position of the skid supporting frame.

10. Landing gear for aircraft comprising a shock absorber for the tail of the craft, a second shock absorber for the body of the craft and means whereby landing pressure on one shock absorber may operate to force fluid from that shock absorber into the other shock absorber.

11. Landing gear for aircraft comprising a shock absorber beneath the body of the craft, a shock absorber beneath the tail of the craft, an oil tank, connections between the shock absorbers and the oil tank including a three-way valve substantially as and for the purpose described.

12. Landing gear for aircraft comprising in combination a skid arranged to be pivotally connected to the body of a craft, a hydraulic plunger mechanism operable to resist the shocks of landing and means for forcing fluid into said mechanism to adjust the position of the skid relative to the body of the craft.

13. A landing gear for aircraft comprising, in combination, an under-frame, a ground engaging wheel mounted thereon, a skid having a track engaging projection toward its forward end, an eccentric connecting said skid to the under-frame and rotatable to raise and lower the frame relative to the ground engaging wheel, a fluid shock absorber connecting said skid to the under-frame and means for pumping fluid into one side of said shock absorber to tilt the skid in a longitudinal plane whereby the skid may be so adjusted to engage the ground toward its forward end and to permit engagement of the wheel with the ground.

14. A landing gear for aircraft comprising, in combination, an under-frame, a skid mounted on said under-frame and adjustable in a longitudinal vertical plane to cause the forward portion or the rear portion to be positioned for engaging the ground upon landing, a shock absorber operable to resist shocks in tension or compression to thereby yieldably resist shocks of landing when either the forward end or rear portion of the skid engages the ground.

15. Landing gear for aircraft comprising an hydraulic shock resisting mechanism having in combination a cylinder, a plunger movable in said cylinder, a by-pass connecting opposite sides of said plunger and valve means arranged gradually to close said by-pass to increase resistance to movement of the plunger and means for adjusting the initial position of the plunger relative to the cylinder.

16. Landing gear for aircraft comprising an hydraulic shock resisting mechanism having in combination a cylinder, a plunger movable in said cylinder, a by-pass connecting opposite sides of said plunger and valve means arranged gradually to close said by-pass under control of the relative movement of the plunger to increase resistance to movement of the plunger and means for adjusting the initial position of the plunger relative to the cylinder.

17. Landing gear for aircraft comprising, in combination, a body, a cylinder, a ground engaging element pivoted to said body, a piston connected to said ground engaging element and movable in said cylinder, said piston being arranged to operate as a shock absorber to resist the force exerted on the landing member upon landing, and means to position said piston within the cylinder comprising a spring for forcing said piston in one direction and means to supply fluid pressure against said piston to force it in the opposite direction.

18. Landing gear for aircraft comprising, in combination, a body, a cylinder, a ground engaging element pivoted to said body, a piston connected to said ground engaging element and movable in said cylinder, said piston being arranged to operate as a shock absorber to resist the forces exerted on the landing member upon landing, spring means acting upwardly on said piston and tending to hold the same in predetermined position and means for applying fluid pressure downwardly to force the piston downward and compress said spring.

19. Landing gear for aircraft comprising a landing wheel positioned to engage the ground beneath the body of the craft, a second landing element position to engage the ground beneath the tail of the craft, a shock absorber between the body of the craft and the landing wheel a second shock absorber between the tail of the craft and the second landing element and means whereby landing pressure on one shock absorber may operate to force fluid into the other shock absorber whereby the relative position of the two landing elements is changed.

20. In an aircraft the combination with the fuselage of a landing gear frame pivoted on a transverse pivot directly to the main body of the fuselage to move as a unit in a vertical plane extending longitudinally of the craft, means for resisting pivotal movement of the frame relative to the fuselage and a ground engaging element carried by the frame.

21. In an aircraft the combination with the fuselage of a landing gear frame pivoted as a unit on a transverse pivot directly to the main body of the fuselage at a point relatively close to the center of gravity thereof, shock absorbing means for resisting pivotal movement of the frame relative to the fuselage and a ground engaging element carried by the frame.

22. In an aircraft the combination with the fuselage of a landing gear frame pivoted on a transverse pivot through the fuselage to move in a unit in a vertical plane extending longitudinally of the craft, means for controlling the pivotal movement of the frame relative to the fuselage comprising a cylinder carried by the fuselage, a piston within the cylinder connected to the landing gear frame, a spring for forcing said piston in one direction and means to supply fluid pressure against said piston to force it in the opposite direction.

ALEXANDER PROCOFIEFF-SEVERSKY.